(12) United States Patent
Cai

(10) Patent No.: US 11,487,829 B2
(45) Date of Patent: Nov. 1, 2022

(54) METHOD AND DEVICE FOR DISPLAYING RELATED INFORMATION BASED ON DISPLAY OPERATION OF AN INFORMATION FLOW PAGE

(71) Applicant: LIANSHANG (XINCHANG) NETWORK TECHNOLOGY CO., LTD., Shaoxing (CN)

(72) Inventor: Panjin Cai, Shaoxing (CN)

(73) Assignee: LIANSHANG (XINCHANG) NETWORK TECHNOLOGY CO., LTD., Shaoxing (CN)

(*) Notice: Subject to any disclaimer, the term of this patent is extended or adjusted under 35 U.S.C. 154(b) by 44 days.

(21) Appl. No.: 16/951,982

(22) Filed: Nov. 18, 2020

(65) Prior Publication Data

US 2021/0073298 A1 Mar. 11, 2021

Related U.S. Application Data

(63) Continuation of application No. PCT/CN2018/125617, filed on Dec. 29, 2018.

(30) Foreign Application Priority Data

May 18, 2018 (CN) .......................... 201810480103.0

(51) Int. Cl.
*G06F 16/951* (2019.01)
*G06F 16/958* (2019.01)
*G06F 3/04847* (2022.01)

(52) U.S. Cl.
CPC ........ *G06F 16/951* (2019.01); *G06F 3/04847* (2013.01); *G06F 16/958* (2019.01)

(58) Field of Classification Search
None
See application file for complete search history.

(56) References Cited

U.S. PATENT DOCUMENTS 8,302,074 B1 * 10/2012 Waldorf ................ G06F 16/958
717/110
2007/0288514 A1 * 12/2007 Reitter ................. G06F 16/951
707/E17.135

(Continued)

FOREIGN PATENT DOCUMENTS

CN 105302461 A 2/2016
CN 105630876 A 6/2016

(Continued)

*Primary Examiner* — Henry Orr
(74) *Attorney, Agent, or Firm* — Bayramoglu Law Offices LLC

(57) ABSTRACT

A method and a device for displaying information and searching information are provided. The method includes: in response to detecting a display operation of an information flow page performed by a user, displaying the information flow page obtained from a network device (201), wherein an information flow is displayed on the information flow page; in response to detecting an obtaining operation of related information of selected information in the information flow performed by the user, obtaining the related information of the selected information from the network device (202); and switching the selected information displayed on the information flow page to the related information of the selected information (203). By means of the method, frequent switching between pages is avoided, and the related information of the selected information is rapidly displayed.

14 Claims, 9 Drawing Sheets

(56) References Cited

U.S. PATENT DOCUMENTS

| | | | |
|---|---|---|---|
| 2009/0293013 A1* | 11/2009 | O'Shaugnessy | G06F 3/0485 |
| | | | 715/810 |
| 2013/0086466 A1* | 4/2013 | Levy | G06F 21/10 |
| | | | 715/738 |
| 2017/0205993 A1* | 7/2017 | Wang | G06F 3/04845 |
| 2017/0357437 A1* | 12/2017 | Peterson | G06F 40/134 |
| 2018/0314762 A1* | 11/2018 | Rathod | G06F 16/951 |
| 2019/0339852 A1* | 11/2019 | Tseng | G06F 16/743 |
| 2020/0012727 A1* | 1/2020 | Lewis | G06Q 10/101 |
| 2021/0073298 A1* | 3/2021 | Cai | G06F 16/951 |

FOREIGN PATENT DOCUMENTS

| | | |
|---|---|---|
| CN | 105930536 A | 9/2016 |
| CN | 108646972 A | 10/2018 |

* cited by examiner

700

| 701 |
| --- |
| In response to receiving an obtaining request for an information flow page from a terminal device, send the information flow page to the terminal device |

| 702 |
| --- |
| In response to receiving an obtaining request for related information of selected information in an information flow from the terminal device, send the related information of the selected information to the terminal device |

FIG. 7

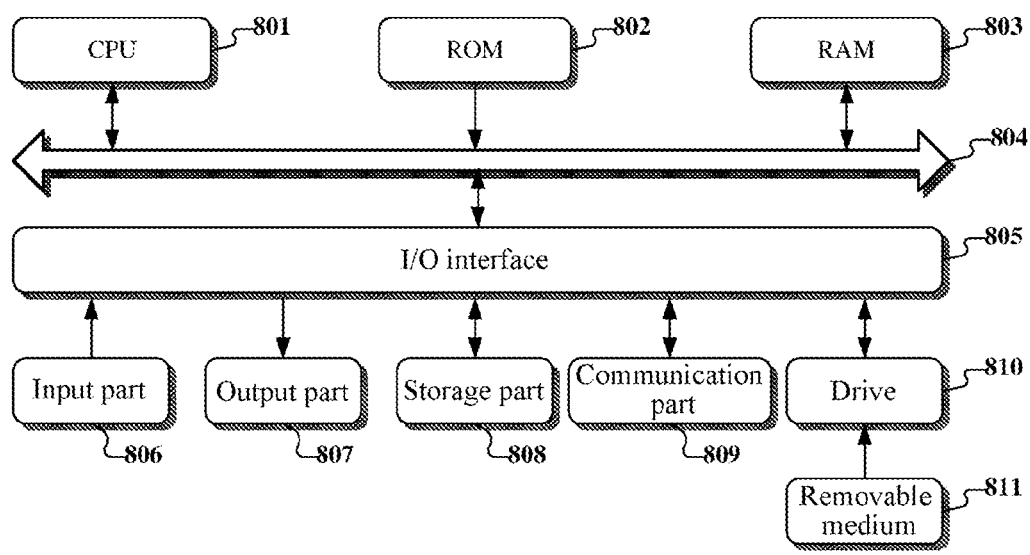

FIG. 8

METHOD AND DEVICE FOR DISPLAYING RELATED INFORMATION BASED ON DISPLAY OPERATION OF AN INFORMATION FLOW PAGE

CROSS REFERENCE TO THE RELATED APPLICATIONS

This application is the continuation application of International Application No. PCT/CN2018/125617, filed on Dec. 29, 2018, which is based upon and claims priority to Chinese Patent Application No. 201810480103.0, filed on May 18, 2018, the entire contents of which are incorporated herein by reference.

TECHNICAL FIELD

Embodiments of the present application relate to the field of computer technologies, and in particular, to a method and a device for displaying information and searching information.

BACKGROUND

Generally, an information flow refers to a group of ordered information. For example, information in the information flow may be sorted according to a sequence of publishing time, or may be sorted in combination with the degree of interest of a user in information in the information flow.

Currently, a plurality of types of client applications (for example, social platform software or a news client) are provided with an information flow page on which an information flow may be displayed. Generally, the information flow on the information flow page only includes newly published information. When the user intends to browse related information of one piece of information in the information flow, the user generally needs to switch to a search page to search the related information of the piece of information and browse the related information of the piece of information on the search page, or switch to a home page of a publisher of the piece of information, to browse the related information of the piece of information on the home page of the publisher of the piece of information. After the user finishes browsing, the user needs to return to the information flow page again to browse other information.

SUMMARY

Embodiments of the present application provide a method and a device for displaying information and searching information.

According to a first aspect, an embodiment of the present application provides a method for displaying information, applicable to a terminal device, the method including: in response to detecting a display operation of an information flow page performed by a user, displaying the information flow page obtained from a network device, where an information flow being displayed on the information flow page; in response to detecting an obtaining operation of related information of selected information in the information flow performed by the user, obtaining the related information of the selected information from the network device; and switching the selected information displayed on the information flow page to the related information of the selected information.

In some embodiments, the obtaining the related information of the selected information from the network device includes: sending the selected information to the network device; and receiving the related information of the selected information returned by the network device and obtained through searching based on searching information corresponding to the related information of the selected information.

In some embodiments, the obtaining the related information of the selected information from the network device includes: determining searching information corresponding to the related information of the selected information; sending the searching information corresponding to the related information of the selected information to the network device; and receiving the related information of the selected information returned by the network device and obtained through searching based on the searching information corresponding to the related information of the selected information.

In some embodiments, the determining searching information corresponding to the related information of the selected information includes: extracting key information of the selected information, and using the key information of the selected information as the searching information corresponding to the related information of the selected information.

In some embodiments, the in response to detecting an obtaining operation of related information of selected information in the information flow performed by the user includes: in response to detecting a slide operation performed on the selected information by the user; and the switching the selected information displayed on the information flow page to the related information of the selected information includes: removing the selected information from the information flow page in an animation switching manner of sliding-out, and moving the related information of the selected information onto the information flow page in an animation switching manner of sliding-in at the same time.

In some embodiments, the determining searching information corresponding to the related information of the selected information includes: obtaining an identifier of a publisher of the selected information and an index of the selected information; and using the identifier of the publisher of the selected information as an identifier of a publisher of the related information of the selected information, generating an index of the related information of the selected information based on the index of the selected information, and using the identifier of the publisher of the related information of the selected information and the index of the related information of the selected information as the searching information corresponding to the related information of the selected information.

In some embodiments, the in response to detecting an obtaining operation of related information of selected information in the information flow performed by the user includes: in response to detecting an operation of sliding to a first preset direction performed on the selected information by the user; and the generating an index of the related information of the selected information based on the index of the selected information includes: adding the index of the selected information by a first preset value, to generate the index of the related information of the selected information.

In some embodiments, the switching the selected information displayed on the information flow page to the related information of the selected information includes: removing the selected information from the information flow page in an animation switching manner of sliding-out to the first preset direction, and moving the related information of the selected information onto the information flow page in an animation switching manner of sliding-in to the first preset direction at the same time.

In some embodiments, the in response to detecting an obtaining operation of related information of selected information in the information flow performed by the user includes: in response to detecting an operation of sliding to a second preset direction performed on the selected information by the user; and the generating an index of the related information of the selected information based on the index of the selected information includes: reducing the index of the selected information by a second preset value, to generate the index of the related information of the selected information.

In some embodiments, the switching the selected information displayed on the information flow page to the related information of the selected information includes: removing the selected information from the information flow page in an animation switching manner of sliding-out to the second preset direction, and moving the related information of the selected information onto the information flow page in an animation switching manner of sliding-in to the second preset direction at the same time.

According to a second aspect, an embodiment of the present application provides a method for searching information, applicable to a network device, the method including: in response to receiving an obtaining request for an information flow page from a terminal device, sending the information flow page to the terminal device, where an information flow being displayed on the information flow page; and in response to receiving an obtaining request for related information of selected information in the information flow and sent by the terminal device, sending the related information of the selected information to the terminal device.

In some embodiments, the obtaining request includes the selected information; and before the sending the related information of the selected information to the terminal device, the method further includes: determining searching information corresponding to the related information of the selected information; and performing searching based on the searching information corresponding to the related information of the selected information, to obtain the related information of the selected information.

In some embodiments, the determining searching information corresponding to the related information of the selected information includes: extracting key information of the selected information, and using the key information of the selected information as the searching information corresponding to the related information of the selected information.

In some embodiments, the determining searching information corresponding to the related information of the selected information includes: obtaining an identifier of a publisher of the selected information and an index of the selected information; and using the identifier of the publisher of the selected information as an identifier of a publisher of the related information of the selected information, generating an index of the related information of the selected information based on the index of the selected information, and using the identifier of the publisher of the related information of the selected information and the index of the related information of the selected information as the searching information corresponding to the related information of the selected information.

In some embodiments, the obtaining request includes information representing that a user performs an operation of sliding to a first preset direction on the selected information; and the generating an index of the related information of the selected information based on the index of the selected information includes: adding the index of the selected information by a first preset value, to generate the index of the related information of the selected information.

In some embodiments, the obtaining request includes information representing that a user performs an operation of sliding to a second preset direction on the selected information; and the generating an index of the related information of the selected information based on the index of the selected information includes: reducing the index of the selected information by a second preset value, to generate the index of the related information of the selected information.

In some embodiments, the obtaining request includes searching information corresponding to the related information of the selected information; and before the sending the related information of the selected information to the terminal device, the method further includes: performing searching based on the searching information corresponding to the related information of the selected information, to obtain the related information of the selected information.

In some embodiments, the searching information corresponding to the related information of the selected information includes key information of the selected information; and the performing searching based on the searching information corresponding to the related information of the selected information, to obtain the related information of the selected information includes: matching the key information of the selected information with key information of information other than the selected information in a pre-stored information set; and obtaining information matched successfully as the related information of the selected information.

In some embodiments, the searching information corresponding to the related information of the selected information includes an identifier of a publisher of the related information of the selected information and an index of the related information of the selected information; and the performing searching based on the searching information corresponding to the related information of the selected information, to obtain the related information of the selected information includes: matching the identifier of the publisher of the related information of the selected information with identifiers of publishers of information sets in a pre-stored information set group; obtaining an information set matched successfully; matching the index of the related information of the selected information with indexes of information in the information set matched successfully; and obtaining information matched successfully as the related information of the selected information.

According to a third aspect, an embodiment of the present application provides an apparatus for displaying information, disposed in a terminal device, the apparatus including: a display unit, configured to display, in response to detecting a display operation of an information flow page performed by a user, the information flow page obtained from a network device, where an information flow being displayed on the information flow page; an obtaining unit, configured to obtain, in response to detecting an obtaining operation of related information of selected information in the information flow performed by the user, the related information of the selected information from the network device; and a switching unit, configured to switch the selected information displayed on the information flow page to the related information of the selected information.

According to a fourth aspect, an embodiment of the present application provides an apparatus for searching information, disposed in a network device, the apparatus includes: a first sending unit, configured to send, in response to receiving an obtaining request for an information flow page from a terminal device, the information flow page to the terminal device, where an information flow being displayed on the information flow page; and a second sending unit, configured to send, in response to receiving an obtaining request for related information of selected information in the information flow and sent by the terminal device, the related information of the selected information to the terminal device.

According to a fifth aspect, an embodiment of the present application provides a terminal device, including: one or more processors; and a storage apparatus, storing one or more programs, the one or more programs, when executed by the one or more processors, causing the one or more processors to implement the method according to any one of the implementations in the first aspect.

According to a sixth aspect, an embodiment of the present application provides a network device, including: one or more processors; and a storage apparatus, storing one or more programs, the one or more programs, when executed by the one or more processors, causing the one or more processors to implement the method according to any one of the implementations in the second aspect.

According to a seventh aspect, an embodiment of the present application provides a computer-readable medium, storing a computer program, the computer program, when executed by a processor, implementing the method according to any one of the implementations in the first aspect or in the second aspect.

According to the method and the device for displaying information and searching information provided in the embodiments of the present application, in a case of detecting the display operation of the information flow page performed by the user, the terminal device displays the information flow page obtained from the network device. Then, in a case of detecting the obtaining operation of the related information of the selected information in the information flow performed by the user, the terminal device obtains the related information of the selected information from the network device, and switches the selected information displayed on the information flow page to the related information of the selected information. By switching the selected information to the related information of the selected information to be directly displayed on the information flow page, frequent switching between pages is avoided, and the related information of the selected information can be rapidly displayed.

BRIEF DESCRIPTION OF THE DRAWINGS

Other features, objectives, and advantages of the present application become more obvious by reading the detailed description of non-limiting embodiments that is provided with reference to the following accompanying drawings:

FIG. 7 is a flowchart of an embodiment of a method for searching information according to the present application; and FIG. 8 is a schematic structural diagram of a computer system adapted to implement a terminal device or a network device according to an embodiment of the present application.

DETAILED DESCRIPTION OF THE EMBODIMENTS

The present application is further described in detail below with reference to the accompanying drawings and embodiments. It may be understood that specific embodiments described herein are only used to explain a related invention, but not to limit the invention. In addition, it should be further noted that, for ease of description, the accompanying drawings only show parts relevant to the related invention.

It should be noted that the embodiments in the present application and features in the embodiments can be combined with each other in the case of no conflict. The present application is described in detail below with reference to the accompanying drawings and the embodiments.

Figure 1:
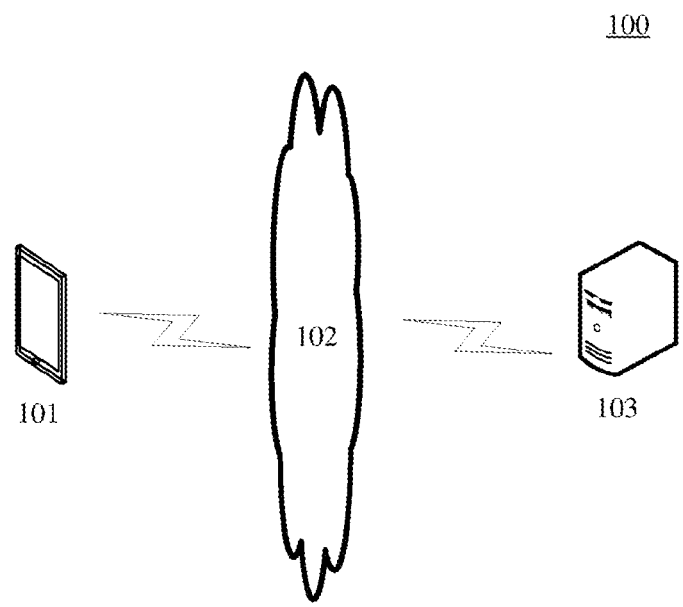
FIG. 1 is a diagram of an exemplary system architecture to which the present application is applicable.

FIG. 1 shows an exemplary system architecture 100 to which embodiments of a method for displaying information and searching information of the present application are applicable.

As shown in FIG. 1, the system architecture 100 may include a terminal device 101, a network 102, and a network device 103. The network 102 is a medium configured to provide a communication link between the terminal device 101 and the network device 103. The network 102 may include various connection types, such as a wired or wireless communication link, or a fiber optic cable.

A user may use the terminal device 101 to interact with the network device 103 through the network 102, to receive or send a message or the like. Various client applications, such as social platform software, an instant messaging tool, a news client, and a webpage browsing application, may be installed on the terminal device 101.

The terminal device 101 may be hardware or software. When the terminal device 101 is hardware, it may be various electronic devices that support display of an information flow, including but not limited to a smartphone, a tablet computer, a laptop portable computer, a desktop computer, and the like. When the terminal device 101 is software, it may be installed in the foregoing listed electronic devices. The terminal device may be implemented as a plurality of pieces of software or software modules, or as a single piece of software or software module. This is not specifically limited herein.

The network device 103 may be a network device providing various services. For example, the network device 103 may be a backend server of various communication client applications installed on the terminal device 101. In a case of receiving an obtaining request for an information flow page and sent by the terminal device 101, the backend server may generate the information flow page, and return the information flow page to the terminal device 101. Alternatively, in a case of receiving an obtaining request for related information of selected information in an information flow and sent by the terminal device, the backend server may search the related information of the selected information, and return the related information of the selected information to the terminal device 101.

It should be noted that the network device 103 may be hardware or software. When the network device 103 is hardware, it may be implemented as a distributed network device cluster formed by a plurality of network devices, or as a single network device. When the network device 103 is software, it may be implemented as a plurality of pieces of software or software modules (for example, configured to provide distributed services), or as a single piece of software or software module. This is not specifically limited herein.

It should be noted that, the method for displaying information provided in this embodiment of the present application may be performed by the terminal device 101, and the method for searching information may be performed by the network device 103.

It should be understood that quantities of terminal devices, networks, and network devices in FIG. 1 are only schematic. According to implementation requirements, there may be any quantity of terminal devices, networks, and network devices.

Figure 2:
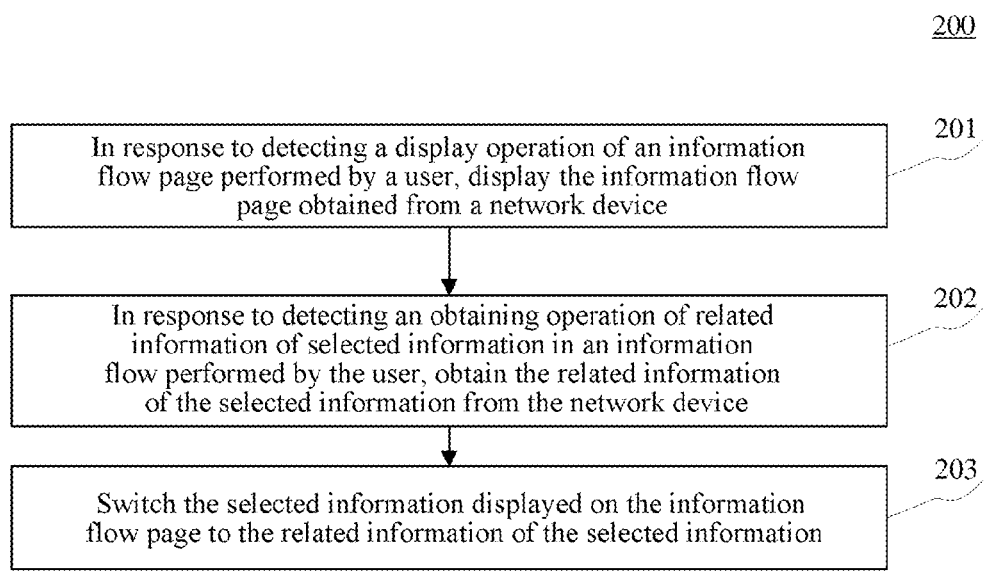
FIG. 2 is a flowchart of an embodiment of a method for displaying information according to the present application.

FIG. 2 shows a procedure 200 of an embodiment of a method for displaying information according to the present application. The method for displaying information is applicable to a terminal device, and includes the following steps:

Step 201. In response to detecting a display operation of an information flow page performed by a user, display the information flow page obtained from a network device.

In this embodiment, the terminal device (for example, the terminal device 101 shown in FIG. 1) on which the method for displaying information runs may detect the display operation of the information flow page performed by the user. In a case of detecting a display operation of an information flow page performed by a user, the terminal device may obtain an information flow page from a network device (for example, the network device 103 shown in FIG. 1), and then displays the obtained information flow page on a screen. An information flow may be displayed on the information flow page. Generally, the information flow refers to a group of ordered information. For example, information in the information flow may be sorted according to a sequence of publishing time, or may be sorted in combination with the degree of interest of a user in information in the information flow.

In practice, the terminal device may use a client application such as social platform software, an instant messaging tool, a news client, or a webpage browsing application that is installed on the terminal device to display the information flow page. For example, for the social platform software or the news client, when the user opens the social platform software or the news client installed on the terminal device, a display operation of the information flow page is performed. In this case, a home page of the social platform software or the news client may be displayed on the screen of the terminal device, and the home page is generally the information flow page. For the instant messaging tool, when the user opens the instant messaging tool installed on the terminal device, a home page of the instant messaging tool may be displayed on the screen of the terminal device, and the home page is generally provided with an information flow page switching button. When the user taps the information flow page switching button, the screen of the terminal device may switch to display an information flow page. An operation that the user taps the information flow page switching button is the display operation of the information flow page performed by the user. For the webpage browsing application, when the user opens the webpage browsing application installed on the terminal device, a home page of the webpage browsing application may be displayed on the screen of the terminal device, and the home page is generally provided with an information flow page region. When the user performs a display operation of the information flow page region, the screen of the terminal device may switch to display an information flow page. The display operation performed on the information flow page region by the user is the display operation of the information flow page performed by the user. The display operation performed on the information flow page region may be an operation used for instructing to display the information flow page, which includes, but is not limited to, a tap operation, a slide operation, a gesture operation, and the like performed on the information flow page region.

Generally, the network device may be a backend server of the client application such as the social platform software, the instant messaging tool, the news client, or the webpage browsing application that is installed on the terminal device. For example, for the social platform software, when the user performs a display operation of the information flow page, the terminal device may be triggered to send an obtaining request for the information flow page to the backend server of the social platform software. In this case, the backend server of the social platform software may find an information set newly published by a user followed by a currently logged-in user, and then sort information in the information set according to a sequence of publishing time of the information in the information set, to generate an information flow page displaying an information flow. For the news client, when the user performs a display operation of the information flow page, the terminal device may be triggered to send an obtaining request for the information flow page to the backend server of the news client. In this case, the backend server of the news client may find a newly published information set in which a current user may have interest according to a historical browsing record of the current user, and then sort information in the information set according to a sequence of publishing time of the information in the information set or a degree of possible interest of the current user in the information in the information set, to generate an information flow page displaying an information flow.

Step 202. In response to detecting an obtaining operation of related information of selected information in the information flow performed by the user, obtain the related information of the selected information from the network device.

In this embodiment, the terminal device may detect the obtaining operation of the related information of the selected information in the information flow performed by the user, and in a case of detecting the obtaining operation of the related information of the selected information in the information flow performed by the user, the terminal device may obtain the related information of the selected information from the network device.

In practice, if the user performs a select operation on information in the information flow on the information flow page displayed on the screen of the terminal device, the information is the selected information. The select operation may be an operation used for instructing to select the information in the information flow, which includes, but is not limited to, a tap operation, a press operation, a touch and hold operation, and the like. When the user performs the obtaining operation of the related information of the selected information in the information flow, the terminal device may be triggered to send an obtaining request for the related information of the selected information to the network device. In this case, the network device may find the related information of the selected information, and send the found related information of the selected information to the terminal device. The obtaining operation may be an operation used for instructing to obtain the related information of the selected information, which includes, but is not limited to, a slide operation, a gesture operation, and the like performed on the selected information.

In some embodiments, in a case of detecting the obtaining operation of the related information of the selected information in the information flow performed by the user, the terminal device may first determine searching information corresponding to the related information of the selected information; then send the searching information corresponding to the related information of the selected information to the network device; and finally receive the related information of the selected information returned by the network device and obtained through searching based on the searching information corresponding to the related information of the selected information. The searching information corresponding to the related information of the selected information may include, but is not limited to, key information corresponding to the related information of the selected information, an index corresponding to the related information of the selected information, and the like. The network device may use the searching information corresponding to the related information of the selected information to search an information set stored in the network device, to obtain the related information of the selected information. Generally, each piece of searching information may correspond to at least one piece of information in the information set.

In some embodiments, the terminal device may first send the selected information to the network device. Then, the network device may determine the searching information corresponding to the related information of the selected information, and search based on the searching information corresponding to the related information of the selected information, to obtain the related information of the selected information. Finally, the terminal device may receive the related information of the selected information returned by the network device and obtained through searching based on the searching information corresponding to the related information of the selected information.

Step 203. Switch the selected information displayed on the information flow page to the related information of the selected information.

In this embodiment, the terminal device may switch the selected information displayed on the information flow page to the related information of the selected information. That is, the selected information is deleted from the information flow page, and the related information of the selected information is added to the information flow page.

According to the method for displaying information provided in this embodiment of the present application, in a case of detecting the display operation of the information flow page performed by the user, the terminal device displays the information flow page obtained from the network device. Then, in a case of detecting the obtaining operation of the related information of the selected information in the information flow performed by the user, the terminal device obtains the related information of the selected information from the network device, and switches the selected information displayed on the information flow page to the related information of the selected information. By switching the selected information to the related information of the selected information to be directly displayed on the information flow page, frequent switching between pages is avoided, and the related information of the selected information can be rapidly displayed.

Figure 3:
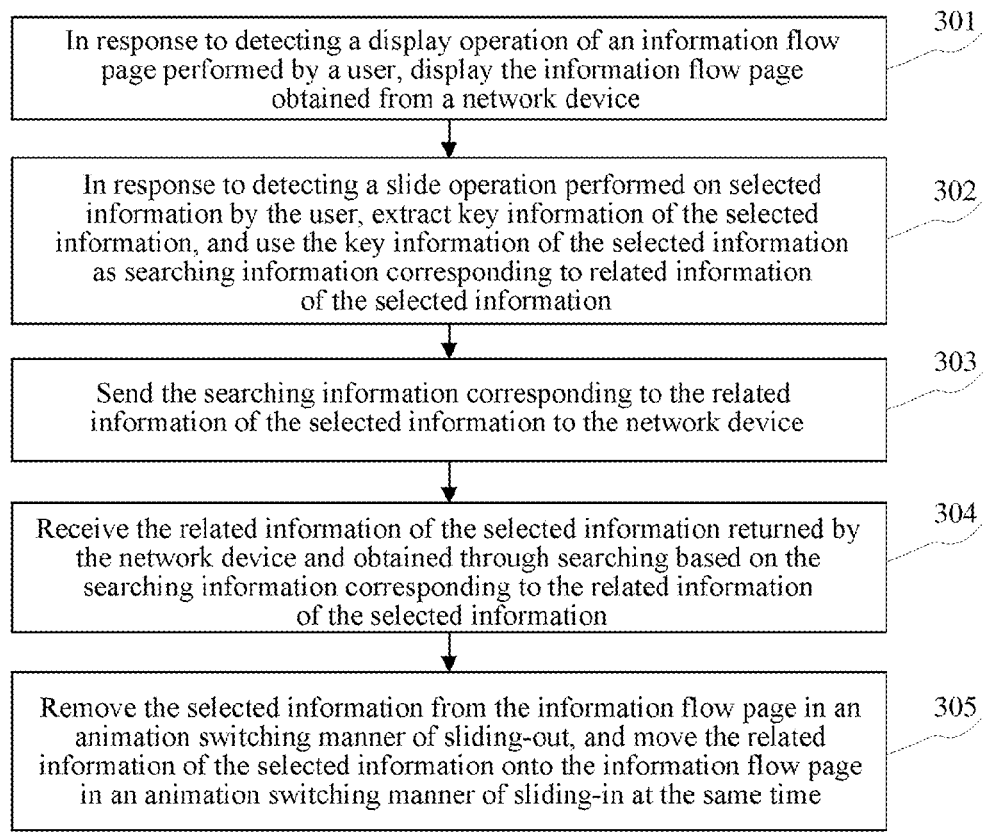
FIG. 3 is a flowchart of another embodiment of a method for displaying information according to the present application.

Further, FIG. 3 shows a procedure 300 of another embodiment of a method for displaying information according to the present application. The method for displaying information is applicable to a terminal device, and includes the following steps:

Step 301. In response to detecting a display operation of an information flow page performed by a user, display the information flow page obtained from a network device.

In this embodiment, specific operations of step 301 are basically the same as the operations of step 201 in the embodiment shown in FIG. 2. Details are not described herein again.

Step 302. In response to detecting a slide operation performed on selected information by the user, extract key information of the selected information, and use the key information of the selected information as searching information corresponding to related information of the selected information.

In this embodiment, the terminal device may detect the slide operation performed on the selected information by the user, and in a case of detecting the slide operation performed on the selected information by the user, the terminal device may extract the key information of the selected information, and use the key information of the selected information as the searching information corresponding to the related information of the selected information. The slide operation performed on the selected information by the user may be an operation that the user touches and holds the selected information by using a finger and slides to a preset direction (for example, leftward or rightward), or may be a slide operation that the user touches and holds the selected information by using a finger and draws a preset graph (for example, a circle or a triangle). The terminal device may extract the key information of the selected information from a title and/or content of the selected information. For example, the terminal device may perform word segmentation on the title of the selected information by using various word segmentation methods (for example, an omni-segmentation method), to obtain a key word set of the title of the selected information, and use the key word set of the title of the selected information as the searching information corresponding to the related information of the selected information. In another example, the terminal device may perform word segmentation on the content of the selected information by using various word segmentation methods, to obtain a key word set of the content of the selected information, and then perform importance calculation (for example, by using a term frequency-inverse document frequency (TF-IDF) method) on the key word set of the content of the selected information, to select at least one key word from the key word set of the content of the selected information based on a result of the importance calculation as the searching information corresponding to the related information of the selected information.

Step 303. Send the searching information corresponding to the related information of the selected information to the network device.

In this embodiment, the terminal device may send the related information of the selected information to the network device. Generally, when the user performs a slide operation on the selected information, the terminal device may be triggered to send an obtaining request for the related information of the selected information to the network device, where the obtaining request may include the searching information corresponding to the related information of the selected information.

Step 304. Receive the related information of the selected information returned by the network device and obtained through searching based on the searching information corresponding to the related information of the selected information.

In this embodiment, the network device may search based on the searching information corresponding to the related information of the selected information, to obtain the related information of the selected information, and then send the related information of the selected information to the terminal device. For example, the network device may pre-store an information set, and each piece of information in the information set corresponds to key information of the each piece of information. The key information of the each piece of information in the information set may also be extracted from a title and/or content of the each piece of information. The extraction step of the key information of the each piece of information in the information set is basically the same as the extraction step of the key information of the selected information in step 303. Details are not described herein again. In this way, the network device may match the key information of the selected information with key information of information other than the selected information in the information set, to obtain information matched successfully as the related information of the selected information. For example, the network device may calculate a similarity degree between the key information of the selected information and the key information of the each piece of information other than the selected information in the information set, and use the information of which the similarity degree with the key information of the selected information is largest as the information matched successfully.

Step 305. Remove the selected information from the information flow page in an animation switching manner of sliding-out, and move the related information of the selected information onto the information flow page in an animation switching manner of sliding-in at the same time.

In this embodiment, the terminal device may remove the selected information from the information flow page in an animation switching manner of sliding-out, and move the related information of the selected information onto the information flow page in an animation switching manner of sliding-in at the same time. For example, the selected information is removed from the information flow page in an animation switching manner of sliding-out to a preset direction (for example, leftward or rightward), and the related information of the selected information is moved onto the information flow page in an animation switching manner of sliding-in to the preset direction at the same time.

As an example, when the user touches the selected information, the terminal device may perform the following slide operations:

First, a page framework including at least two pages is created. Two pages are used as an example herein. A second page is located on a right side of a first page, where the first page is visible to the user, the first page is configured to load the selected information, and the second page is configured to load the related information of the selected information.

Then, when the user slides the selected information, the first page gradually slides to the left to move out of the field of view of the user, the second page gradually slides to the left to move into the field of view of the user, and a new page is created at the original position of the second page or the first page is moved to the original position of the second page.

In a sliding process, the selected information gradually slides to the left to move out of the screen, and the related information of the selected information gradually slides to the left to move into the screen, until the selected information entirely slides out of the screen and the related information of the selected information entirely slides into the screen.

It should be noted that, in a case that the related information of the selected information is currently displayed on the screen of the terminal device, if the user touches the related information of the selected information, the related information becomes next selected information, and the terminal device may repeat the foregoing slide operations in this case. By analogy, the sliding process is repeated until the user does not perform the slide operation.

Figure 4A:
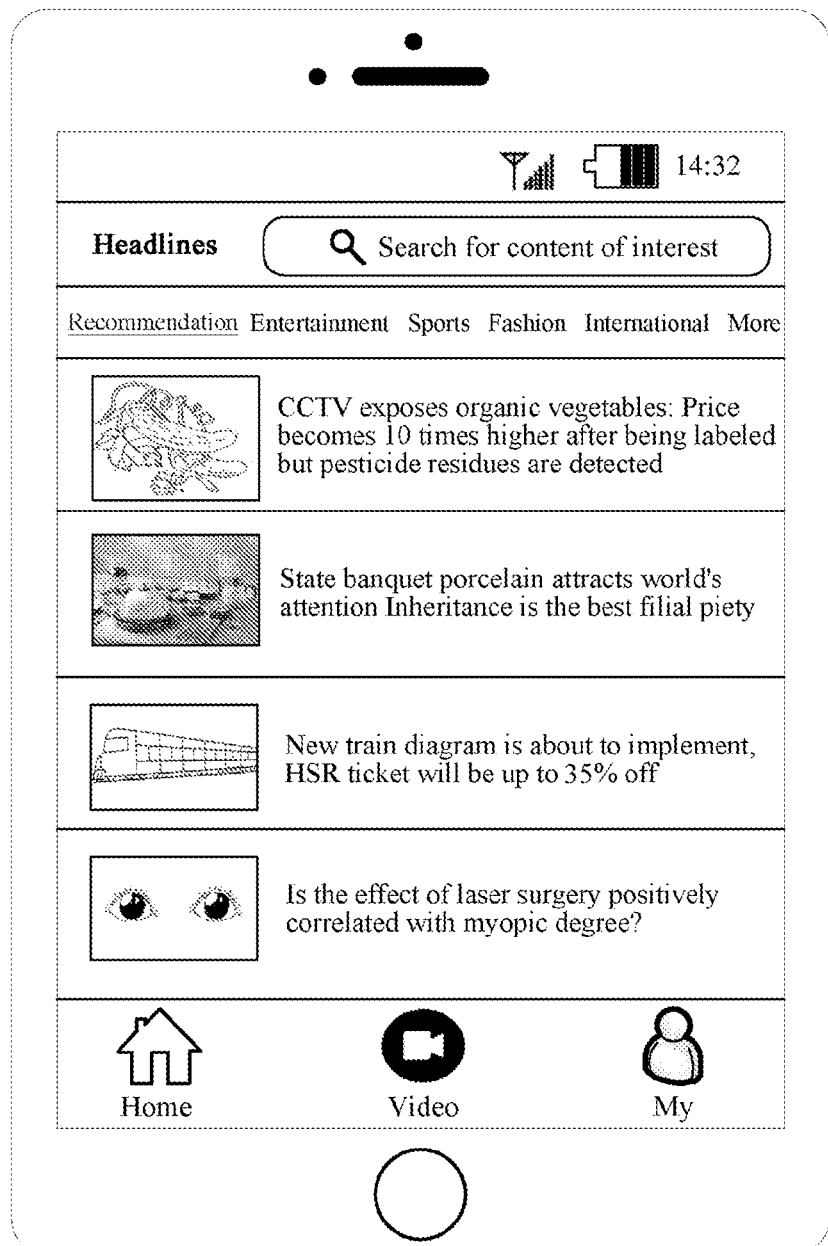
FIG. 4a is a schematic diagram of an information flow page displayed on a screen of a terminal device in an application scenario of the method for displaying information according to FIG. 3.
Figure 4B:
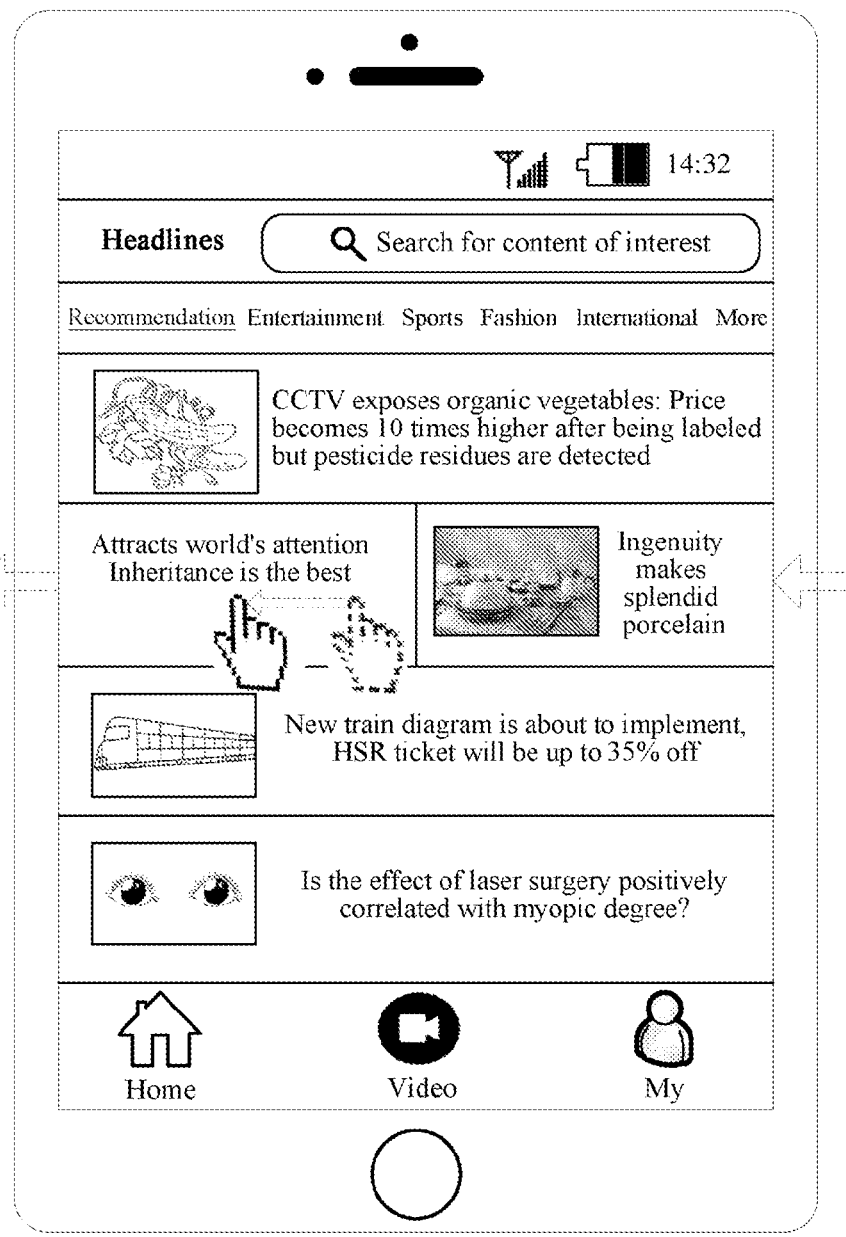
FIG. 4b is a schematic diagram of an information sliding switching process displayed on a screen of a terminal device in an application scenario of the method for displaying information according to FIG. 3.

Herein, an application scenario of the method for displaying information provided in FIG. 3 continues to be described. For example, the user first opens a news client installed on the terminal device. In this case, an information flow page may be displayed on the screen of the terminal device, where the information flow page may be as shown in FIG. 4*a*. Then the user selects a second piece of information in an information flow on the information flow page to slide to the left. In this case, the terminal device may extract key information "State banquet porcelain" of the second piece of information, and send the key information "State banquet porcelain" of the second piece of information to a backend server of the news client. Then the backend server may search by using the key information "State banquet porcelain" of the second piece of information, to obtain related information "Ingenuity makes splendid porcelain, share the state banquet porcelain" of the second piece of information, and send the related information "Ingenuity makes splendid porcelain, share the state banquet porcelain" of the second piece of information to the terminal device. Finally, the terminal device removes the second piece of information from the information flow page in an animation switching manner of sliding-out to the left, and moves the related information "Ingenuity makes splendid porcelain, share the state banquet porcelain" of the second piece of information onto the information flow page in an animation switching manner of sliding-in to the left, where a sliding switching process may be as shown in FIG. 4*b*.

It can be seen from FIG. 3 that, compared with the embodiment corresponding to FIG. 2, in this embodiment, the procedure 300 of the method for displaying information highlights the step of obtaining the related information based on the key information and the step of switching to display the related information on the information flow page in an animation switching manner. Therefore, in the solution described in this embodiment, the information related to the content of the selected information can be rapidly displayed without frequent switching between pages. Besides, the related information is switched to be displayed in an animation switching manner, which is helpful to the operation of the user and implements seamless switching between information.

Figure 5:
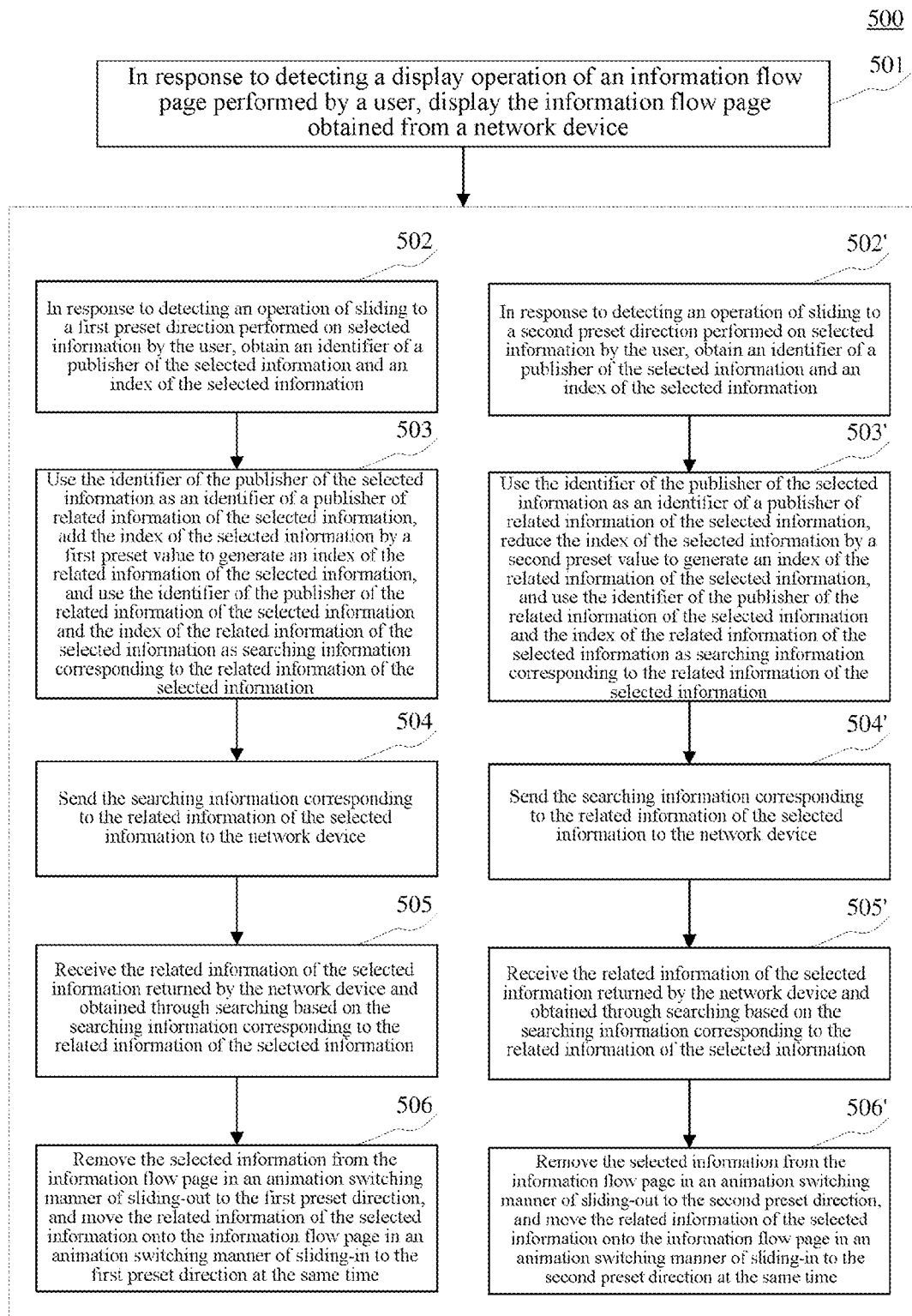
FIG. 5 is a flowchart of another embodiment of a method for displaying information according to the present application.

FIG. 5 shows a procedure 500 of another embodiment of a method for displaying information according to the present application. The method for displaying information is applicable to a terminal device, and includes the following steps:

Step 501. In response to detecting a display operation of an information flow page performed by a user, display the information flow page obtained from a network device.

In this embodiment, specific operations of step 501 are basically the same as the operations of step 201 in the embodiment shown in FIG. 2. Details are not described herein again.

Step 502. In response to detecting an operation of sliding to a first preset direction performed on selected information by the user, obtain an identifier of a publisher of the selected information and an index of the selected information.

In this embodiment, the terminal device may detect the operation of sliding to the first preset direction (for example, leftward) performed on the selected information by the user, and in a case of detecting the operation of sliding to the first preset direction performed on the selected information by the user, the terminal device may obtain the identifier of the publisher of the selected information and the index of the selected information. An identifier of a publisher of information may be formed by letters, numbers, symbols, and the like, and is configured to uniquely identify the publisher of the information. For an information set published by the same publisher, each piece of information in the information set corresponds to an index of the each piece of information. The indexes of the information in the information set may be set according to a plurality of manners. For example, the indexes may be set according to publishing time of the information. Specifically, an index of a first piece of information published by the publisher is set to 1, an index of a second piece of information published by the publisher is set to 2, an index of a third piece of information published by the publisher is set to 3, and so on, to set indexes corresponding to all information in the information set published by the publisher.

Step 503. Use the identifier of the publisher of the selected information as an identifier of a publisher of related information of the selected information, add the index of the selected information by a first preset value to generate an index of the related information of the selected information, and use the identifier of the publisher of the related information of the selected information and the index of the related information of the selected information as searching information corresponding to the related information of the selected information.

In this embodiment, the terminal device may use the identifier of the publisher of the selected information as the identifier of the publisher of the related information of the selected information, generate the index of the related information of the selected information based on the index of the selected information, and use the identifier of the publisher of the related information of the selected information and the index of the related information of the selected information as the searching information corresponding to the related information of the selected information. Herein, the selected information and the related information of the selected information may be information published by the same publisher. Therefore, the selected information and the related information of the selected information have same identifier of the publisher. When the user performs the operation of sliding to the first preset direction on the selected information, the index of the selected information may be added by the first preset value to generate the index of the related information of the selected information. For example, when the user performs an operation of sliding to the left on the selected information, it indicates that the user intends to view a next piece of information of the selected information published by the publisher of the selected information. In this case, the index of the selected information may be added by 1, to generate an index of the next piece of information of the selected information.

Step 504. Send the searching information corresponding to the related information of the selected information to the network device.

In this embodiment, the terminal device may send the related information of the selected information to the network device. Generally, when the user performs the operation of sliding to the first preset direction on the selected information, the terminal device may be triggered to send an obtaining request for the related information of the selected information to the network device, where the obtaining request may include the searching information corresponding to the related information of the selected information.

Step 505. Receive the related information of the selected information returned by the network device and obtained through searching based on the searching information corresponding to the related information of the selected information.

In this embodiment, the network device may search based on the searching information corresponding to the related information of the selected information, to obtain the related information of the selected information, and then send the related information of the selected information to the terminal device. For example, the network device may pre-store an information set group, and each group of information sets in the information set group, corresponds to an identifier of a publisher of the each group of information sets. That is, the same group of information sets has the same publisher. Each piece of information in the information set corresponds to an index of the each piece of information. In this way, the network device may match the identifier of the publisher of the related information of the selected information with identifiers of publishers of information sets in a pre-stored information set group, to obtain an information set matched successfully. The information set of which an identifier is the same as the identifier of the publisher of the related information of the selected information is the information set matched successfully. Then, the network device may match the index of the related information of the selected information with indexes of information in the information set matched successfully, to obtain information matched successfully as the related information of the selected information. The information of which an index is the same as the index of the related information of the selected information is the information matched successfully.

Step 506. Remove the selected information from the information flow page in an animation switching manner of sliding-out to the first preset direction, and move the related information of the selected information onto the information flow page in an animation switching manner of sliding-in to the first preset direction at the same time.

In this embodiment, the terminal device may remove the selected information from the information flow page in an animation switching manner of sliding-out to the first preset direction, and move the related information of the selected information onto the information flow page in an animation switching manner of sliding-in to the first preset direction at the same time. For example, the terminal device may remove the selected information from the information flow page in an animation switching manner of sliding-out to the left, and move the related information of the selected information onto the information flow page in an animation switching manner of sliding-in to the left.

Step 502'. In response to detecting an operation of sliding to a second preset direction performed on selected information by the user, obtain an identifier of a publisher of the selected information and an index of the selected information.

In this embodiment, the terminal device may detect the operation of sliding to the second preset direction (for example, rightward) performed on the selected information by the user, and in a case of detecting the operation of sliding to the second preset direction performed on the selected information by the user, the terminal device may obtain the identifier of the publisher of the selected information and the index of the selected information. An identifier of a publisher of information may be formed by letters, numbers, symbols, and the like, and is configured to uniquely identify the publisher of the information. For an information set published by the same publisher, each piece of information in the information set corresponds to an index of the each piece of information. The indexes of the information in the information set may be set according to a plurality of manners. For example, the indexes may be set according to publishing time of the information. Specifically, an index of a first piece of information published by the publisher is set to 1, an index of a second piece of information published by the publisher is set to 2, an index of a third piece of information published by the publisher is set to 3, and so on, to set indexes corresponding to all information in the information set published by the publisher.

Step 503'. Use the identifier of the publisher of the selected information as an identifier of a publisher of related information of the selected information, reduce the index of the selected information by a second preset value to generate an index of the related information of the selected information, and use the identifier of the publisher of the related information of the selected information and the index of the related information of the selected information as searching information corresponding to the related information of the selected information.

In this embodiment, the terminal device may use the identifier of the publisher of the selected information as the identifier of the publisher of the related information of the selected information, generate the index of the related information of the selected information based on the index of the selected information, and use the identifier of the publisher of the related information of the selected information and the index of the related information of the selected information as the searching information corresponding to the related information of the selected information. Herein, the selected information and the related information of the selected information may be information published by the same publisher. Therefore, the selected information and the related information of the selected information have same identifier of the publisher. When the user performs the operation of sliding to the second preset direction on the selected information, the index of the selected information may be reduced by the second preset value to generate the index of the related information of the selected information. For example, when the user performs an operation of sliding to the right on the selected information, it indicates that the user intends to view a previous piece of information of the selected information published by the publisher of the selected information. In this case, the index of the selected information may be reduced by 1, to generate an index of the previous piece of information of the selected information.

Step 504'. Send the searching information corresponding to the related information of the selected information to the network device.

In this embodiment, the terminal device may send the related information of the selected information to the network device. Generally, when the user performs the operation of sliding to the second preset direction on the selected information, the terminal device may be triggered to send an obtaining request for the related information of the selected information to the network device, where the obtaining request may include the searching information corresponding to the related information of the selected information.

Step 505'. Receive the related information of the selected information returned by the network device and obtained through searching based on the searching information corresponding to the related information of the selected information.

In this embodiment, the network device may search based on the searching information corresponding to the related information of the selected information, to obtain the related information of the selected information, and then send the related information of the selected information to the terminal device. For example, the network device may pre-store an information set group, and each group of information sets in the information set group, corresponds to an identifier of a publisher of the each group of information sets. That is, the same group of information sets has the same publisher. Each piece of information in the information set corresponds to an index of the each piece of information. In this way, the network device may match the identifier of the publisher of the related information of the selected information with identifiers of publishers of information sets in a pre-stored information set group, to obtain an information set matched successfully. The information set of which an identifier is the same as the identifier of the publisher of the related information of the selected information is the information set matched successfully. Then, the network device may match the index of the related information of the selected information with indexes of information in the information set matched successfully, to obtain information matched successfully as the related information of the selected information. The information of which an index is the same as the index of the related information of the selected information is the information matched successfully.

Step 506'. Remove the selected information from the information flow page in an animation switching manner of sliding-out to the second preset direction, and move the related information of the selected information onto the information flow page in an animation switching manner of sliding-in to the second preset direction at the same time.

In this embodiment, the terminal device may remove the selected information from the information flow page in an animation switching manner of sliding-out to the second preset direction, and move the related information of the selected information onto the information flow page in an animation switching manner of sliding-in to the second preset direction at the same time. For example, the terminal device may remove the selected information from the information flow page in an animation switching manner of sliding-out to the right, and move the related information of the selected information onto the information flow page in an animation switching manner of sliding-in to the right.

As an example, when the user touches the selected information, the terminal device may perform the following slide operations:

First, a page framework including at least three pages is created. Three pages are used as an example herein. A first page is located on a left side of a second page, and a third page is located on a right side of the second page. The second page is visible to the user, the first page is configured to load a previous piece of information of the selected information, the second page is configured to load the selected information, and the third page is configured to load a next piece of information of the selected information.

Then, when the user slides the selected information to the left, the second page gradually slides to the left to move out of the field of view of the user, the third page gradually slides to the left to move into the field of view of the user, and a new page is created at the original position of the third page or the first page is moved to the original position of the third page. When the user slides the selected information to the right, the second page gradually slides to the right to move out of the field of view of the user, the first page gradually slides to the right to move into the field of view of the user, and a new page is created at the original position of the first page or the third page is moved to the original position of the first page.

In a process of sliding to the left, the selected information gradually slides to the left to move out of the screen, and the next piece of information of the selected information gradually slides to the left to move into the screen, until the selected information entirely slides out of the screen and the next piece of information of the selected information entirely slides into the screen.

In a process of sliding to the right, the selected information gradually slides to the right to move out of the screen, and the previous piece of information of the selected information gradually slides to the right to move into the screen, until the selected information entirely slides out of the screen and the previous piece of information of the selected information entirely slides into the screen.

It should be noted that, in a case that the next piece of information of the selected information is currently displayed on the screen of the terminal device, if the user touches the next piece of information of the selected information, the next piece of information of the selected information becomes a next piece of selected information. In this case, the terminal device may repeat the foregoing slide operations. By analogy, the sliding process is repeated until the user does not perform the slide operation. Similarly, in a case that the previous piece of information of the selected information is currently displayed on the screen of the terminal device, if the user touches the previous piece of information of the selected information, the previous piece of information of the selected information becomes a next piece of selected information. In this case, the terminal device may repeat the foregoing slide operations. By analogy, the sliding process is repeated until the user does not perform the slide operation.

Figure 6A:
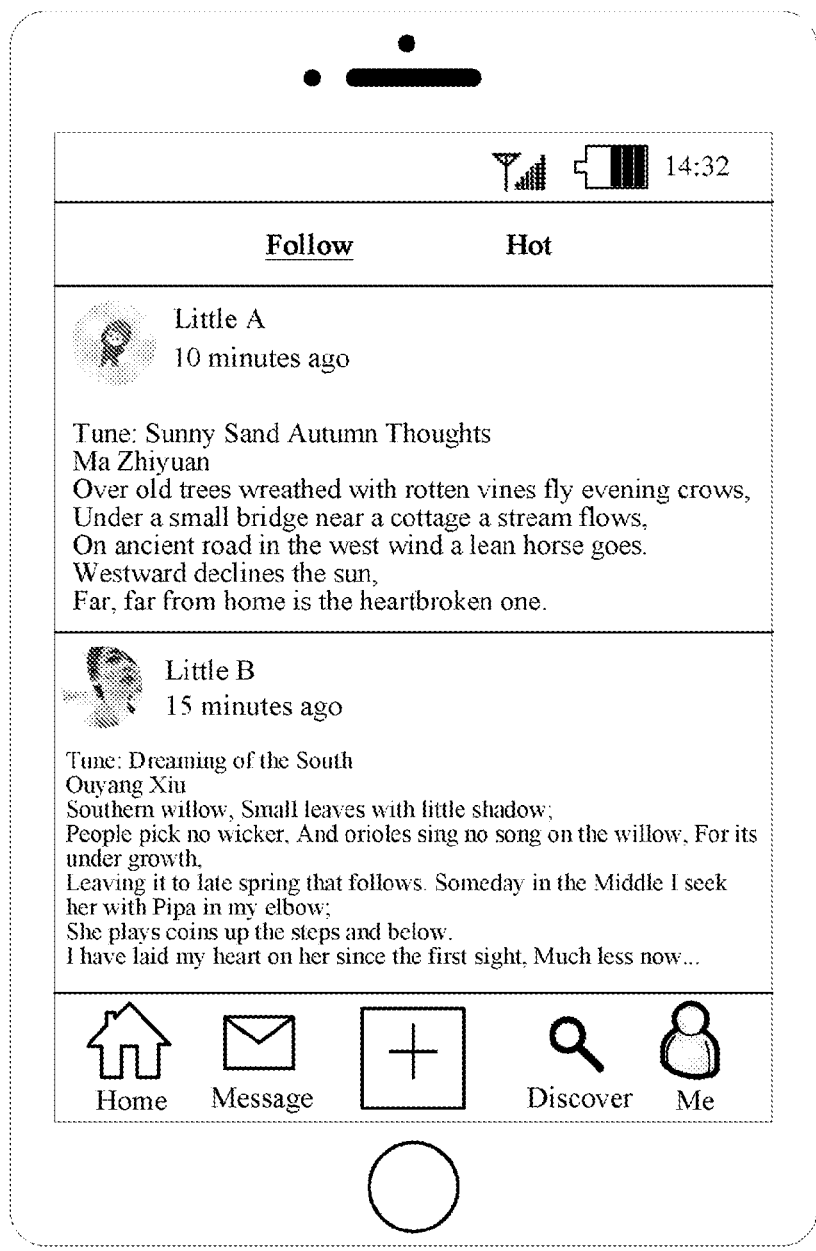
FIG. 6a is a schematic diagram of an information flow page displayed on a screen of a terminal device in an application scenario of the method for displaying information according to FIG. 5.
Figure 6B:
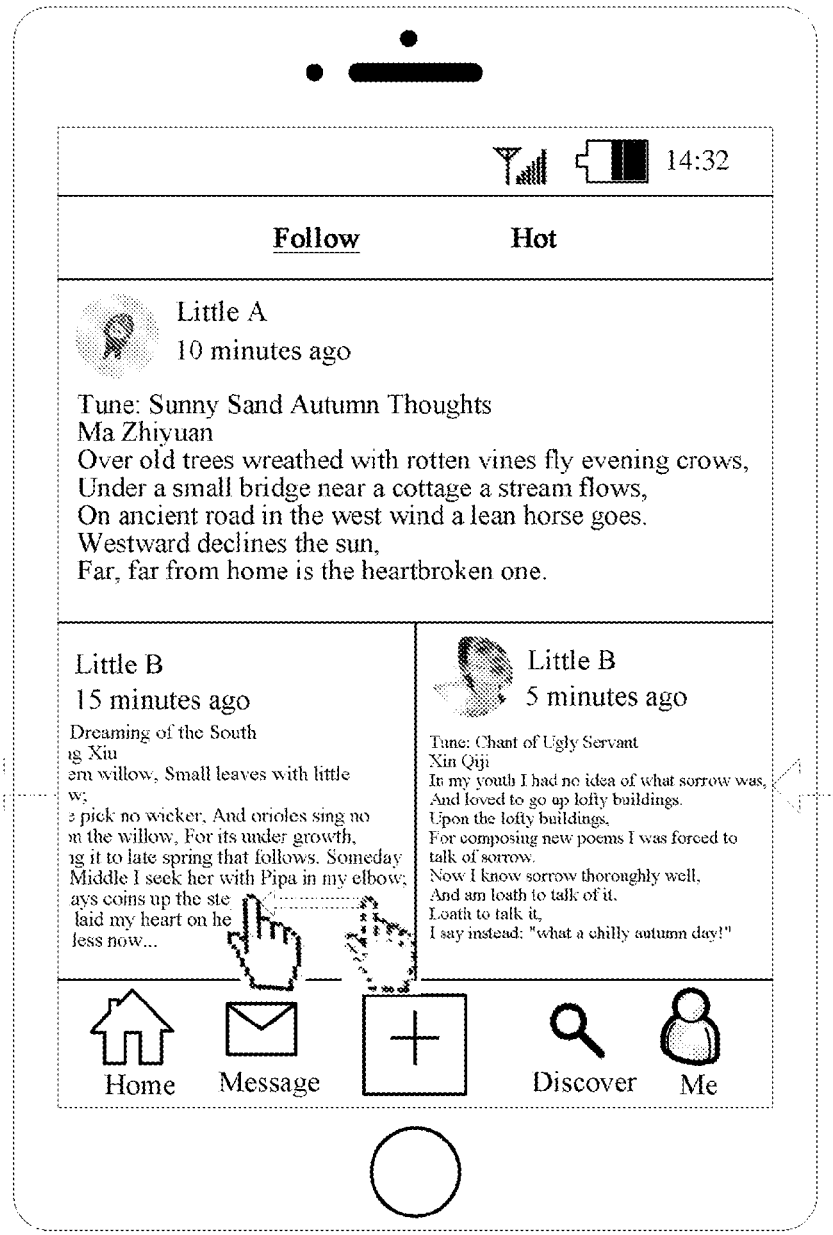
FIG. 6b is a schematic diagram of an information switching process of sliding leftward displayed on a screen of a terminal device in an application scenario of the method for displaying information according to FIG. 5.
Figure 6C:
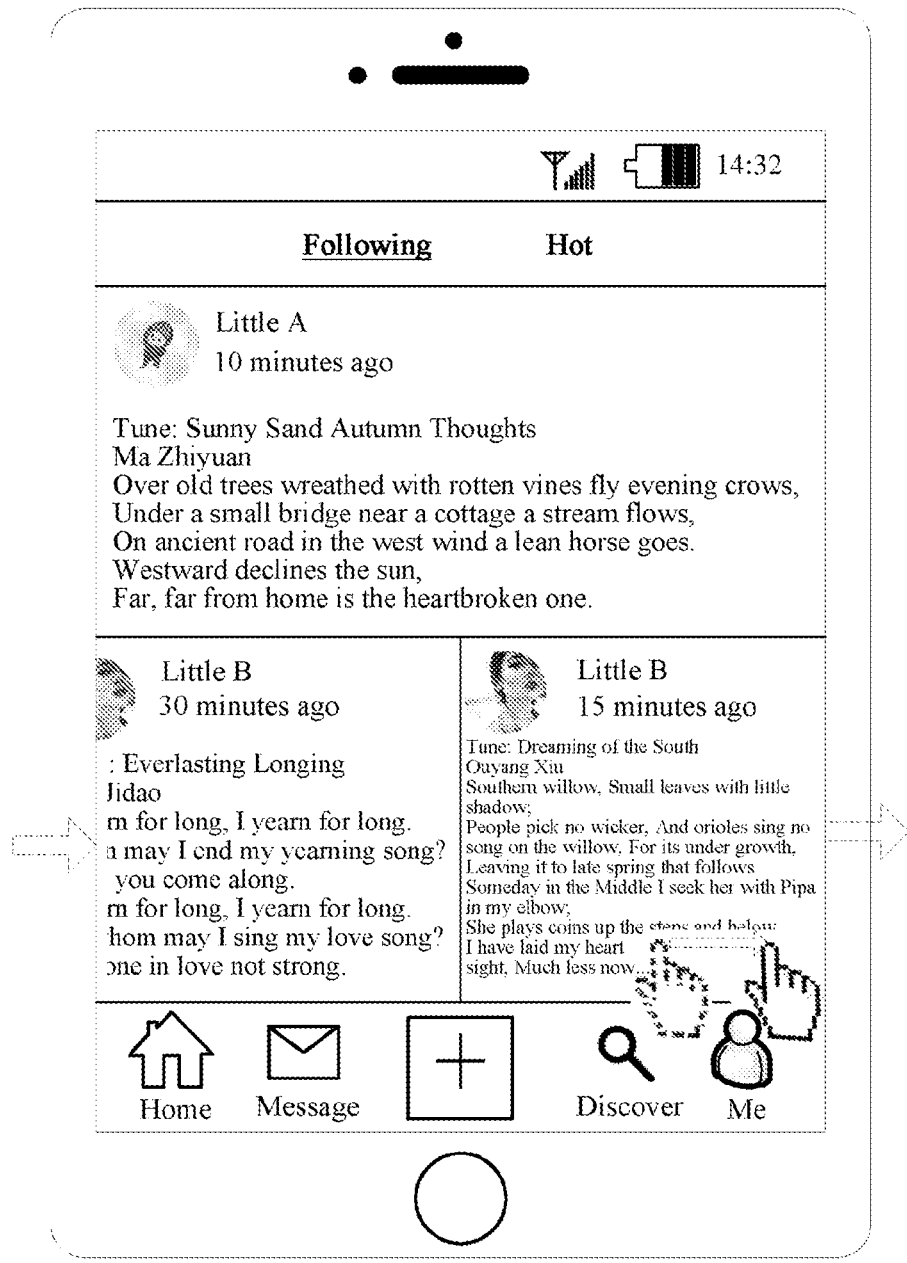
FIG. 6c is a schematic diagram of an information switching process of sliding rightward displayed on a screen of a terminal device in an application scenario of the method for displaying information according to FIG. 5.

Herein, an application scenario of the method for displaying information provided in FIG. 5 continues to be described. For example, the user first opens social platform software installed on the terminal device. In this case, an information flow page may be displayed on the screen of the terminal device, where the information flow page may be as shown in FIG. 6a. As an example, the user selects a second piece of information in an information flow on the information flow page to slide to the left. In this case, the terminal device may determine an identifier of a publisher "Little B" of the second piece of information and an index of a next piece of information published by the publisher "Little B", and send the identifier of the publisher "Little B" and the index of the next piece of information published by the publisher "Little B" to a backend server of the social platform software. Then, the backend server may find the next piece of information "Tune: Chant of ugly Servant" published by the publisher "Little B" according to the identifier of the publisher "Little B" and the index of the next piece of information published by the publisher "Little B", and send the next piece of information "Tune: Chant of Ugly Servant" published by the publisher "Little B" to the terminal device. Finally, the terminal device removes the second piece of information from the information flow page in an animation switching manner of sliding-out to the left, and moves the next piece of information "Tune: Chant of ugly Servant" published by the publisher "Little B" onto the information flow page in an animation switching manner of sliding-in to the left, where a switching process of sliding to the left may be as shown in FIG. 6b. As another example, the user selects a second piece of information in an information flow on the information flow page to slide to the right. In this case, the terminal device may determine an identifier of a publisher "Little B" of the second piece of information and an index of a previous piece of information published by the publisher "Little B", and send the identifier of the publisher "Little B" and the index of the previous piece of information published by the publisher "Little B" to a backend server of the social platform software. Then, the backend server may find the previous piece of information "Tune: Everlasting Longing" published by the publisher "Little B" according to the identifier of the publisher "Little B" and the index of the previous piece of information published by the publisher "Little B", and send the previous piece of information "Tune: Everlasting Longing" published by the publisher "Little B" to the terminal device. Finally, the terminal device removes the second piece of information from the information flow page in an animation switching manner of sliding-out to the right, and moves the previous piece of information "Tune: Everlasting Longing" published by the publisher "Little B" onto the information flow page in an animation switching manner of sliding-in to the right, where a switching process of sliding to the right may be as shown in FIG. 6c.

It can be seen from FIG. 5 that, compared with the embodiment corresponding to FIG. 2, in this embodiment, the procedure 500 of the method for displaying information highlights the step of obtaining the related information based on the identifier of the publisher and the index and the step of switching to display the related information on the information flow page in an animation switching manner. Therefore, in the solution described in this embodiment, other information published by the publisher of the selected information can be rapidly displayed without frequent switching between pages. Besides, the related information is switched to be displayed in an animation switching manner, which is helpful to the operation of the user and implements seamless switching between information.

Further, FIG. 7 shows a procedure 700 of an embodiment of a method for searching information according to the present application. The method for searching information is applicable to a network device, and includes the following steps:

Step 701. In response to receiving an obtaining request for an information flow page from a terminal device, send the information flow page to the terminal device.

In this embodiment, the network device (for example, the network device 103 shown in FIG. 1) on which the method for searching information runs may receive the obtaining request for the information flow page and sent by the terminal device (for example, the terminal device 101 shown in FIG. 1), and in a case of receiving the obtaining request for the information flow page and sent by the terminal device, the network device may send the information flow page to the terminal device. An information flow may be displayed on the information flow page. Generally, the information flow refers to a group of ordered information. For example, information in the information flow may be sorted according to a sequence of publishing time, or may be sorted in combination with the degree of interest of a user in information in the information flow.

Generally, the network device may be a backend server of the client application such as the social platform software, the instant messaging tool, the news client, or the webpage browsing application that is installed on the terminal device. For example, for the social platform software, when the user performs a display operation of the information flow page, the terminal device may be triggered to send an obtaining request for the information flow page to the backend server of the social platform software. In this case, the backend server of the social platform software may find an information set newly published by a user followed by a currently logged-in user, and then sort information in the information set according to a sequence of publishing time of the information in the information set, to generate an information flow page displaying an information flow. For the news client, when the user performs a display operation of the information flow page, the terminal device may be triggered to send an obtaining request for the information flow page to the backend server of the news client. In this case, the backend server of the news client may find a newly published information set in which a current user may have interest according to a historical browsing record of the current user, and then sort information in the information set according to a sequence of publishing time of the information in the information set or a degree of possible interest of the current user in the information in the information set, to generate an information flow page displaying an information flow.

Step 702. In response to receiving an obtaining request for related information of selected information in an information flow and sent by the terminal device, send the related information of the selected information to the terminal device.

In this embodiment, the network device may receive the obtaining request for the related information of the selected information in the information flow and sent by the terminal device, and in a case of receiving the obtaining request for the related information of the selected information in the information flow and sent by the terminal device, the network device may send the related information of the selected information to the terminal device.

In practice, if the user performs a select operation on information in the information flow on the information flow page displayed on the screen of the terminal device, the information is the selected information. The select operation may be an operation used for instructing to select the information in the information flow, which includes, but is not limited to, a tap operation, a press operation, a touch and hold operation, and the like. When the user performs the obtaining operation of the related information of the selected information in the information flow, the terminal device may be triggered to send an obtaining request for the related information of the selected information to the network device. In this case, the network device may find the related information of the selected information, and send the found related information of the selected information to the terminal device. The obtaining operation may be an operation used for instructing to obtain the related information of the selected information, which includes, but is not limited to, a slide operation, a gesture operation, and the like performed on the selected information.

In some embodiments, in a case of receiving the obtaining request for the related information of the selected information in the information flow and sent by the terminal device, the network device may determine searching information corresponding to the related information of the selected information; and search based on the searching information corresponding to the related information of the selected information, to obtain the related information of the selected information. The obtaining request may include the selected information. The searching information corresponding to the related information of the selected information may include, but is not limited to, key information corresponding to the related information of the selected information, an index corresponding to the related information of the selected information, and the like. The network device may use the searching information corresponding to the related information of the selected information to search an information set stored in the network device, to obtain the related information of the selected information. Generally, each piece of searching information may correspond to at least one piece of information in the information set.

In some embodiments, the network device may extract key information of the selected information, and use the key information of the selected information as the searching information corresponding to the related information of the selected information. Herein, the network device may extract the key information of the selected information from a title and/or content of the selected information. For example, the network device may perform word segmentation on the title of the selected information by using various word segmentation methods (for example, an omni-segmentation method), to obtain a key word set of the title of the selected information, and use the key word set of the title of the selected information as the searching information corresponding to the related information of the selected information. In another example, the network device may perform word segmentation on the content of the selected information by using various word segmentation methods, to obtain a key word set of the content of the selected information, and then perform importance calculation (for example, by using a TF-IDF method) on the key word set of the content of the selected information, to select at least one key word from the key word set of the content of the selected information based on a result of the importance calculation as the searching information corresponding to the related information of the selected information.

In some embodiments, the network device may obtain an identifier of a publisher of the selected information and an index of the selected information; and use the identifier of the publisher of the selected information as an identifier of a publisher of the related information of the selected information, generate an index of the related information of the selected information based on the index of the selected information, and use the identifier of the publisher of the related information of the selected information and the index of the related information of the selected information as the searching information corresponding to the related information of the selected information. An identifier of a publisher of information may be formed by letters, numbers, symbols, and the like, and is configured to uniquely identify the publisher of the information. For an information set published by the same publisher, each piece of information in the information set corresponds to an index of the each piece of information. The indexes of the information in the information set may be set according to a plurality of manners. For example, the indexes may be set according to publishing time of the information. Specifically, an index of a first piece of information published by the publisher is set to 1, an index of a second piece of information published by the publisher is set to 2, an index of a third piece of information published by the publisher is set to 3, and so on, to set indexes corresponding to all information in the information set published by the publisher.

In some embodiments, in a case that the obtaining request includes information representing that a user performs an operation of sliding to a first preset direction on the selected information, the network device may add the index of the selected information by a first preset value, to generate an index of the related information of the selected information.

In some embodiments, in a case that the obtaining request includes information representing that a user performs an operation of sliding to a second preset direction on the selected information, the network device may reduce the index of the selected information by a second preset value, to generate an index of the related information of the selected information.

In some embodiments, in a case of receiving the obtaining request for the related information of the selected information in the information flow and sent by the terminal device, the network device may search based on the searching information corresponding to the related information of the selected information, to obtain the related information of the selected information. The obtaining request may include the searching information corresponding to the related information of the selected information. The searching information corresponding to the related information of the selected information may include, but is not limited to, key information corresponding to the related information of the selected information, an index corresponding to the related information of the selected information, and the like. The network device may use the searching information corresponding to the related information of the selected information to search an information set stored in the network device, to obtain the related information of the selected information. Generally, each piece of searching information may correspond to at least one piece of information in the information set.

In some embodiments, the searching information corresponding to the related information of the selected information may include the key information of the selected information. In this way, the network device may match the key information of the selected information with key information of information other than the selected information in a pre-stored information set, to obtain information matched successfully as the related information of the selected information. Herein, the network device may pre-store an information set, and each piece of information in the information set corresponds to key information of the each piece of information. The key information of the each piece of information in the information set may also be extracted from a title and/or content of the each piece of information. For example, the network device may calculate a similarity degree between the key information of the selected information and the key information of the each piece of information other than the selected information in the information set, and use the information of which the similarity degree with the key information of the selected information is largest as the information matched successfully.

In some embodiments, the searching information corresponding to the related information of the selected information may include the identifier of the publisher of the related information of the selected information and the index of the related information of the selected information. In this way, the network device may match the identifier of the publisher of the related information of the selected information with identifiers of publishers of information sets in a pre-stored information set group, to obtain an information set matched successfully; and match the index of the related information of the selected information with indexes of information in the information set matched successfully, to obtain information matched successfully as the related information of the selected information. Herein, the network device may pre-store an information set group, and each group of information sets in the information set group corresponds to an identifier of a publisher of the each group of information sets. That is, the same group of information sets has the same publisher. Each piece of information in the information set corresponds to an index of the each piece of information. The information set of which an identifier is the same as the identifier of the publisher of the related information of the selected information is the information set matched successfully. The information of which an index is the same as the index of the related information of the selected information is the information matched successfully.

According to the method for searching information provided in this embodiment of the present application, in a case of receiving the obtaining request for the information flow page and sent by the terminal device, the network device sends the information flow page to the terminal device. Then, in a case of receiving the obtaining request for the related information of the selected information in the information flow and sent by the terminal device, the network device sends the related information of the selected information to the terminal device. In this way, the terminal device may switch the selected information to the related information of the selected information to be directly displayed on the information flow page, frequent switching between pages is avoided, and the related information of the selected information can be rapidly displayed.

FIG. 8 shows a schematic structural diagram of a computer system 800 adapted to implement a terminal device or a network device (for example, the terminal device 101 or the network device 103 shown in FIG. 1) according to an embodiment of the present application. The terminal device or the network device shown in FIG. 8 is merely an example, and should not impose any limitation on a function and use scope of the embodiments of the present application.

As shown in FIG. 8, the computer system 800 includes a central processing unit (CPU) 801, which can perform various proper actions and processing according to a program stored in a read-only memory (ROM) 802 or a program loaded from a storage part 808 into a random access memory (RAM) 803. In the RAM 803, various programs and data that are required for operations of the system 800 are further stored. The CPU 801, the ROM 802, and the RAM 803 are connected to each other by using a bus 804. An input/output (I/O) interface 805 is also connected to the bus 804.

Components connected to the I/O interface 805 are as the following: an input part 806 including a keyboard, a mouse, or the like; an output part 807 including a cathode ray tube (CRT), a liquid crystal display (LCD), a speaker, or the like; a storage part 808 including a hard disk, or the like; and a communication part 809 including a network interface card such as a LAN card or a modem. The communication part 809 performs communication processing through a network such as the Internet. A drive 810 is also connected to the I/O interface 805 as required. A removable medium 811, such as a magnetic disk, an optical disc, a magneto-optical disk, or a semiconductor memory, is installed on the drive 810 as required, so that a computer program read from the removable medium is installed into the storage part 808 as required.

In particular, according to the embodiments of the present disclosure, the processes described above with reference to the flowchart may be implemented as a computer software program. For example, the embodiments of the present disclosure include a computer program product, including a computer program carried on a computer readable medium. The computer program includes program code for performing the method shown in the flowchart. In such an embodiment, the computer program may be downloaded and installed through the communication part 809 from a network, and/or installed from the removable medium 811. When the computer program is executed by the CPU 801, the foregoing functions defined in the method of the present application are performed. It should be noted that, the computer-readable medium shown in the present application may be a computer-readable signal medium, a computer-readable medium, or any combination thereof. The computer-readable medium may be, for example, but is not limited to, an electrical, magnetic, optical, electromagnetic, infrared, or semiconductor system, apparatus, or device, or any combination thereof. A more specific example of the computer-readable medium may include, but is not limited to: an electrical connection with one or more wires, a portable computer disk, a hard disk, a random access memory (RAM), a read-only memory (ROM), an erasable programmable read-only memory (EPROM or a flash memory), an optical fiber, a portable compact disc read-only memory (CD-ROM), an optical storage device, a magnetic storage device, or any suitable combination thereof. In the present application, the computer-readable medium may be any tangible medium including or storing a program, and the program may be used by or used in combination with an instruction execution system, apparatus, or device. In the present application, the computer-readable signal medium may include a data signal that is in a baseband or propagated as a part of a carrier wave, the data signal carrying computer-readable program code. The propagated data signal may be in a plurality of forms, including but not limited to, an electromagnetic signal, an optical signal, or any suitable combination thereof. The computer-readable signal medium may alternatively be any computer-readable medium other than the computer-readable medium. The computer-readable medium may send, propagate or transmit a program that is used by or used in combination with an instruction execution system, apparatus or device. The program code contained in the computer-readable medium may be transmitted by using any appropriate medium, including but not limited to: a wireless medium, a wire, an optical cable, RF, any suitable combination thereof, or the like.

One or more programming languages or any combination thereof may be used to write the computer program code used for performing the operations in the present application. The programming languages include, but are not limited to an object oriented programming language such as Java, Smalltalk, C++, or the like and a conventional procedural programming language, such as the C programming language or a similar programming language. The program code may be executed entirely on a computer of a user, partly on the computer of the user, as a stand-alone software package, partly on the computer of the user and partly on a remote computer, or entirely on the remote computer or a server. For the case involving a remote computer, the remote computer may be connected to a computer of a user through any type of network including a local area network (LAN) or a wide area network (WAN), or may be connected to an external computer (for example, through the Internet by using an Internet service provider).

The flowcharts and block diagrams in the accompanying drawings show architectures, functions, and operations that may be implemented for the system, the method, and the computer program product according to the embodiments of the present application. In this regard, each block in the flowchart or the block diagram may represent a module, a program segment, or a part of code. The module, the program segment, or the part of the code includes one or more executable instructions for implementing a specified logical function. It should also be noted that, in some alternative implementations, functions marked in boxes may alternatively occur in a sequence different from that marked in the accompanying drawing. For example, two boxes shown in succession may be actually performed basically in parallel, and sometimes the two boxes may be performed in a reverse sequence. This depends on a related function. It should also be noted that, each block in the block diagram and/or the flowchart, and a combination of blocks in the block diagram and/or the flowchart, may be implemented by using a specific hardware-based system that performs specified functions or operations, or may be implemented by using a combination of special-purpose hardware and computer instructions.

Related units described in the embodiments of the present application may be implemented in a software manner, or may be implemented in a hardware manner. The described units may alternatively be disposed in a processor. For example, the processor may be described as: a processor including a display unit, an obtaining unit, and a switching unit. Names of the units do not constitute a limitation on the units under certain circumstances. For example, the display unit may alternatively be described as "a unit configured to display, in response to detecting a display operation of an information flow page performed by a user, the information flow page obtained from a network device". In another example, the processor may alternatively be described as: a processor including a first sending unit and a second sending unit. Names of the units do not constitute a limitation on the units under certain circumstances. For example, the first sending unit may alternatively be described as "a unit configured to send, in response to receiving an obtaining request for an information flow page from a terminal device, the information flow page to the terminal device".

According to another aspect, the present application further provides a computer-readable medium. The computer-readable medium may be included in the terminal device or the network device described in the foregoing embodiments, or may exist alone and is not disposed in the terminal device or the network device. The computer-readable medium carries one or more programs, and when the one or more programs are executed by the terminal device or the network device, the terminal device is caused to: in response to detecting a display operation of an information flow page performed by a user, display the information flow page obtained from the network device, where an information flow being displayed on the information flow page; in response to detecting an obtaining operation of related information of selected information in the information flow performed by the user, obtain the related information of the selected information; and switch the selected information displayed on the information flow page to the related information of the selected information. Alternatively, the network device is caused to: in response to receiving an obtaining request for an information flow page and sent by the terminal device, send the information flow page to the terminal device, where an information flow being displayed on the information flow page; and in response to receiving an obtaining request for related information of the selected information in the information flow and sent by the terminal device, send the related information of the selected information to the terminal device.

The foregoing descriptions are merely exemplary embodiments of the present application and explanations of the applied technical principles. A person skilled in the art should understand that the scope of the present application is not limited to the technical solutions that are formed by the foregoing particular combinations of technical features, but shall also encompass other technical solutions formed by arbitrarily combining the foregoing technical features or equivalent features thereof without departing from the foregoing inventive concept. For example, technical solutions formed by replacing the foregoing features with technical features having similar functions disclosed in the present application (but not limited thereto) are also included.

What is claimed is:

1. A method implemented at a terminal device for displaying information, comprising:
    in response to detecting a display operation of an information flow page performed by a user, displaying the information flow page obtained from a network device, wherein an information flow is displayed on the information flow page;
    in response to detecting an obtaining operation of related information of selected information in the information flow performed by the user, obtaining the related information of the selected information from the network device, comprises:
        determining searching information corresponding to the related information of the selected information;
        sending the searching information corresponding to the related information of the selected information to the network device; and
        receiving the related information of the selected information returned by the network device and obtained through searching based on the searching information corresponding to the related information of the selected information; and
    switching the selected information displayed on the information flow page to the related information of the selected information;
    wherein the step of determining the searching information corresponding to the related information of the selected information comprises:
        obtaining an identifier of a publisher of the selected information and an index of the selected information,
        using the identifier of the publisher of the selected information as an identifier of a publisher of the related information of the selected information,
        generating an index of the related information of the selected information based on the index of the selected information, and
        using the identifier of the publisher of the related information of the selected information and the index of the related information of the selected information as the searching information corresponding to the related information of the selected information;
    wherein the in response to detecting the obtaining operation of the related information of the selected information in the information flow performed by the user comprises:
        in response to detecting an operation of sliding to a first preset direction performed on the selected information by the user; and
    wherein the step of generating the index of the related information of the selected information based on the index of the selected information comprises:
        adding the index of the selected information by a first preset value to generate the index of the related information of the selected information.

2. The method according to claim 1, wherein the step of obtaining the related information of the selected information from the network device comprises:
    sending the selected information to the network device; and
    receiving the related information of the selected information returned by the network device and obtained through searching based on searching information corresponding to the related information of the selected information.

3. The method according to claim 1, wherein the step of determining the searching information corresponding to the related information of the selected information comprises:
    extracting key information of the selected information, and
    using the key information of the selected information as the searching information corresponding to the related information of the selected information.

4. The method according to claim 1, wherein the in response to detecting the obtaining operation of the related information of the selected information performed by the user in the information flow comprises:
    in response to detecting a slide operation performed on the selected information by the user; and
    wherein the step of switching the selected information displayed on the information flow page to the related information of the selected information comprises:
    removing the selected information from the information flow page in an animation switching manner of sliding-out, and moving the related information of the selected information onto the information flow page in an animation switching manner of sliding-in at the same time.

5. The method according to claim 1, wherein the step of switching the selected information displayed on the information flow page to the related information of the selected information comprises:
removing the selected information from the information flow page in an animation switching manner of sliding-out to the first preset direction, and moving the related information of the selected information onto the information flow page in an animation switching manner of sliding-in to the first preset direction at the same time.

6. The method according to claim 1, wherein the in response to detecting the obtaining operation of the related information of the selected information in the information flow performed by the user comprises:
in response to detecting an operation of sliding to a second preset direction performed on the selected information by the user; and
wherein the step of generating the index of the related information of the selected information based on the index of the selected information comprises:
reducing the index of the selected information by a second preset value to generate the index of the related information of the selected information.

7. The method according to claim 6, wherein the step of switching the selected information displayed on the information flow page to the related information of the selected information comprises:
removing the selected information from the information flow page in an animation switching manner of sliding-out to the second preset direction, and moving the related information of the selected information onto the information flow page in an animation switching manner of sliding-in to the second preset direction at the same time.

8. A method implemented at a network device for searching information, comprising:
in response to receiving an obtaining request for an information flow page from a terminal device, sending the information flow page to the terminal device, wherein an information flow is displayed on the information flow page;
in response to receiving the obtaining request for related information of selected information in the information flow from the terminal device, sending the related information of the selected information to the terminal device;
wherein the obtaining request comprises the selected information;
before sending the related information of the selected information to the terminal device, the method further comprises:
determining searching information corresponding to the related information of the selected information; and
performing searching based on the searching information corresponding to the related information of the selected information, to obtain the related information of the selected information;
wherein the step of determining the searching information corresponding to the related information of the selected information comprises:
obtaining an identifier of a publisher of the selected information and an index of the selected information,
using the identifier of the publisher of the selected information as an identifier of a publisher of the related information of the selected information,
generating an index of the related information of the selected information based on the index of the selected information, and
using the identifier of the publisher of the related information of the selected information and the index of the related information of the selected information as the searching information corresponding to the related information of the selected information;
wherein the obtaining request comprises information representing that a user performs an operation of sliding to a first preset direction on the selected information; and
wherein the step of generating the index of the related information of the selected information based on the index of the selected information comprises:
adding the index of the selected information by a first preset value to generate the index of the related information of the selected information.

9. The method according to claim 8, wherein the step of determining the searching information corresponding to the related information of the selected information comprises:
extracting key information of the selected information, and using the key information of the selected information as the searching information corresponding to the related information of the selected information.

10. The method according to claim 8, wherein the obtaining request comprises information representing that a user performs an operation of sliding to a second preset direction on the selected information; and
wherein the step of generating the index of the related information of the selected information based on the index of the selected information comprises:
reducing the index of the selected information by a second preset value to generate the index of the related information of the selected information.

11. The method according to claim 8, wherein the obtaining request comprises the searching information corresponding to the related information of the selected information; and
before sending the related information of the selected information to the terminal device, the method further comprises:
performing searching based on the searching information corresponding to the related information of the selected information, to obtain the related information of the selected information.

12. The method according to claim 8, wherein the searching information corresponding to the related information of the selected information comprises key information of the selected information; and
wherein the step of performing searching based on the searching information corresponding to the related information of the selected information to obtain the related information of the selected information comprises:
matching the key information of the selected information with key information of information other than the selected information in a pre-stored information set; and
obtaining information matched successfully as the related information of the selected information.

13. The method according to claim 8, wherein the searching information corresponding to the related information of the selected information comprises an identifier of a publisher of the related information of the selected information and an index of the related information of the selected information; and wherein the step of performing searching based on the searching information corresponding to the related information of the selected information to obtain the related information of the selected information comprises:
matching the identifier of the publisher of the related information of the selected information with identifiers of publishers of information sets in a pre-stored information set group;
obtaining an information set matched successfully;
matching the index of the related information of the selected information with indexes of information in the information set matched successfully; and
obtaining information matched successfully as the related information of the selected information.

14. A terminal device, comprising:
one or more processors; and
a storage apparatus, storing one or more programs,
the one or more programs, when executed by the one or more processors, causing the one or more processors to implement the following operations:
in response to detecting a display operation of an information flow page performed by a user, displaying the information flow page obtained from a network device, wherein an information flow is displayed on the information flow page;
in response to detecting an obtaining operation of related information of selected information in the information flow performed by the user, obtaining the related information of the selected information from the network device, comprises:
determining searching information corresponding to the related information of the selected information;
sending the searching information corresponding to the related information of the selected information to the network device; and
receiving the related information of the selected information returned by the network device and obtained through searching based on the searching information corresponding to the related information of the selected information; and
switching the selected information displayed on the information flow page to the related information of the selected information;
wherein the step of determining the searching information corresponding to the related information of the selected information comprises:
obtaining an identifier of a publisher of the selected information and an index of the selected information,
using the identifier of the publisher of the selected information as an identifier of a publisher of the related information of the selected information,
generating an index of the related information of the selected information based on the index of the selected information, and
using the identifier of the publisher of the related information of the selected information and the index of the related information of the selected information as the searching information corresponding to the related information of the selected information;
wherein the in response to detecting the obtaining operation of the related information of the selected information in the information flow performed by the user comprises:
in response to detecting an operation of sliding to a first preset direction performed on the selected information by the user; and
wherein the step of generating the index of the related information of the selected information based on the index of the selected information comprises:
adding the index of the selected information by a first preset value to generate the index of the related information of the selected information.

* * * * *